(12) United States Patent
Botzko et al.

(10) Patent No.: US 9,661,376 B2
(45) Date of Patent: May 23, 2017

(54) VIDEO ERROR CONCEALMENT METHOD

(75) Inventors: Stephen Botzko, Reading, MA (US); Ilan Yona, Tel Aviv (IL); Moshe Elbaz, Kiriat Bialik (IL); Michael Horowitz, Austin, TX (US)

(73) Assignee: Polycom, Inc., San Jose, CA (US)

( * ) Notice: Subject to any disclaimer, the term of this patent is extended or adjusted under 35 U.S.C. 154(b) by 3010 days.

(21) Appl. No.: 11/180,899

(22) Filed: Jul. 13, 2005

(65) Prior Publication Data

US 2007/0014360 A1    Jan. 18, 2007

(51) Int. Cl.
| | |
|---|---|
| H04N 7/12 | (2006.01) |
| H04N 11/02 | (2006.01) |
| H04N 11/04 | (2006.01) |
| H04N 21/438 | (2011.01) |
| H04N 21/2383 | (2011.01) |
| H04N 21/647 | (2011.01) |
| H04N 19/176 | (2014.01) |
| H04N 19/51 | (2014.01) |
| H04N 19/513 | (2014.01) |

(Continued)

(52) U.S. Cl.
CPC ....... *H04N 21/4382* (2013.01); *H04N 19/107* (2014.11); *H04N 19/115* (2014.11); *H04N 19/166* (2014.11); *H04N 19/169* (2014.11); *H04N 19/176* (2014.11); *H04N 19/188* (2014.11); *H04N 19/51* (2014.11); *H04N 19/513* (2014.11); *H04N 19/553* (2014.11); *H04N 19/61* (2014.11); *H04N 19/65* (2014.11); *H04N 19/66* (2014.11); *H04N 19/895* (2014.11); *H04N 21/2383* (2013.01); *H04N 21/64738* (2013.01); *H04N 21/64769* (2013.01); *H04N 21/64784* (2013.01)

(58) Field of Classification Search
CPC .................................. H04N 7/50; H04N 7/68
USPC ............ 375/240.01–240.06, 240.12–240.16, 375/240.25–240.27
See application file for complete search history.

(56) References Cited

U.S. PATENT DOCUMENTS

| | | | |
|---|---|---|---|
| 5,136,378 A | 8/1992 | Tsurube | |
| 5,442,400 A | * 8/1995 | Sun et al. | ................ 375/240.15 |

(Continued)

FOREIGN PATENT DOCUMENTS

| | | | |
|---|---|---|---|
| CN | 1554151 A | 12/2004 | |
| EP | 0 933 948 A2 | 8/1999 | ............... H04N 7/50 |

(Continued)

OTHER PUBLICATIONS

"First Office Action" received in corresponding China application No. 200610106418.6 dated Aug. 22, 2008.

(Continued)

*Primary Examiner* — Chikaodili E Anyikire
(74) *Attorney, Agent, or Firm* — Blank Rome, LLP

(57) ABSTRACT

Disclosed herein is a system and method for reconstruction video information lost as a result of transmission errors. The system and method have four aspects, including: (1) changing the bit and/or packet rate; (2) inserting redundant information into the video bitstream; (3) providing automatic refresh of certain regions of the video on a periodic basis; and (4) interleaving coded macroblocks into diversity groups for transmission to spatially spread the effect of lost packets. The image reconstruction may then take advantage of these three aspects to provide an enhanced result in the presence of transmission losses.

14 Claims, 1 Drawing Sheet

(51) Int. Cl.
H04N 19/169 (2014.01)
H04N 19/115 (2014.01)
H04N 19/61 (2014.01)
H04N 19/107 (2014.01)
H04N 19/166 (2014.01)
H04N 19/65 (2014.01)
H04N 19/553 (2014.01)
H04N 19/895 (2014.01)
H04N 19/66 (2014.01)

(56) References Cited

U.S. PATENT DOCUMENTS

| | | | |
|---|---|---|---|
| 5,537,338 | A | 7/1996 | Coelho |
| 5,835,144 | A | 11/1998 | Matsumura et al. |
| 6,025,888 | A | 2/2000 | Pauls |
| 6,115,076 | A | 9/2000 | Linzer |
| 6,333,948 | B1 * | 12/2001 | Kurobe et al. ............ 375/240.13 |
| 6,526,099 | B1 * | 2/2003 | Christopoulos et al. 375/240.26 |
| 6,611,561 | B1 | 8/2003 | Hannuksela et al. |
| 6,611,674 | B1 | 8/2003 | Jokimies et al. |
| 6,744,738 | B1 | 6/2004 | Park et al. |
| 6,956,902 | B2 * | 10/2005 | Shen et al. ............... 375/240.16 |
| 6,999,673 | B1 | 2/2006 | Kadono |
| 7,110,719 | B2 | 9/2006 | Horibe et al. |
| 7,272,110 | B2 * | 9/2007 | Lee et al. ...................... 370/209 |
| 7,394,855 | B2 * | 7/2008 | Kong et al. ............. 375/240.27 |
| 2001/0050955 | A1 | 12/2001 | Zhang et al. |
| 2002/0172283 | A1 | 11/2002 | Kawakatsu et al. |
| 2003/0039312 | A1 * | 2/2003 | Horowitz et al. ....... 375/240.24 |
| 2003/0067981 | A1 | 4/2003 | Zhao et al. |
| 2004/0114684 | A1 | 6/2004 | Karczewicz et al. |
| 2005/0078751 | A1 | 4/2005 | Ghanbari et al. |

FOREIGN PATENT DOCUMENTS

| | | | |
|---|---|---|---|
| EP | 1439714 | A2 | 7/2004 |
| JP | 08-256333 | | 1/1996 |
| JP | 11-239353 | | 8/1999 |
| JP | 2000253403 | | 9/2000 |
| JP | 200128752 | | 1/2001 |
| JP | 2001057541 | | 6/2001 |
| JP | 2002152181 | | 5/2002 |
| JP | 2003219385 | | 7/2003 |
| JP | 200496752 | | 3/2004 |
| JP | 2004215252 | | 7/2004 |
| JP | 200551816 | | 2/2005 |
| JP | 2006513635 | | 4/2006 |
| WO | 9829834 | | 7/1998 |
| WO | 0205558 | A1 | 1/2002 |
| WO | 02/071640 | A1 | 9/2002 |
| WO | WO 02/071639 | A1 | 9/2002 | ............... H04B 1/66 |
| WO | 03/019939 | A1 | 3/2003 |
| WO | 03/026136 | A1 | 3/2003 |
| WO | 03/061284 | A1 | 7/2003 |
| WO | 2004064406 | A1 | 7/2004 |

OTHER PUBLICATIONS

Search Report received in corresponding European application Serial 03029292.4-2223-; Oct. 27, 2004.

Robert Shaffer, et al.; "*Improving Perceptual Quality and Network Performance for Transmission of H263 Video over ATM*;" Department of Computing Science, University of Alberta: pp. 1749-1753: Sep. 1999.

Lidinsky, Bill, "Overview of Videoconferencing," PowerPoint Presentation, Oct. 16, 1996, HEP Network Resource Center.

Drew, Mark S., "Video Compression," Class Materials, Original Date of Publication Unknown, School of Computing Science at Simon Fraser University, originally posted at: http://www.cs.sfu.ca/CourseCentral/365/li/materials/notes/Chap4/Chap4.3/Chap4.3html.

Translated First Office Action received in corresponding China patent application (No. 200610106418.6) dated Aug. 22, 2008.

Peng Yin et al., "A Robust Error Resilient Approach for MPEG Video Transmission Over Internet", Visual Communications and Image Processing; Jan. 21, 2002-Jan. 23, 2002; San Jose, Jan. 21, 2002 (Jan. 21, 2002), XP030080506.

Kang Li-Wei et al., "An Error Resilient Coding Scheme Fr H.263 Video Transmission Based on Data Embedding", Real-Time Imaging, Academic Press Limited, GB vol. 11, No. 1, Feb. 1, 2005 (Feb. 1, 2005), pp. 45-58, XP004916961, ISSN: 1077-2014, DOI: DOI: 10.1016/J.RTI. 2005.01.003.

Chang-Su Kim et al., "Robust Transmission of Video Sequence Over Noisy Channel Using Parity-Check Motion Vector", IEEE Transactions on Circuits and Systems for Video Technology, IEEE Service Center, Piscataway, NJ, US, vol. 9, No. 7, Oct. 1, 1999 (Oct. 1, 1999), XP011014622, ISSN: 1051-8215.

Jie Song et al., "A Data Embedded Video Coding Scheme for Error-Prone Channels". IEEE Transactions on Multimedia, IEEE Service Center, Piscataway, NJ, US, vol. 3, No. 4, Dec. 1, 2001 (Dec. 1, 2001), XP011036262, ISSN: 1520-9210.

Wenjun Zeng, "Spatial-Temporal Error Concealment With Side Information for Standard Video Codecs", Proceedings of the 2003 International Conference on Multimedia and Expo: Jul. 6-9, 2003, Baltimore Marriott Waterfront Hotel, Baltimore, Maryland, USA, IEEE Operations Center, US, vol. 2, Jul. 6, 2003 (Jul. 6, 2003), pp. 113-116, XP010650757, ISBN: 978-0/7803-7965-7.

Yilmaz Ayhan et al., "Error Concealment of Video Sequences by Data Hiding", Proceedings 2003 International Conference on Imge Processing (Cat. No. 03CH37429), Barcelona, Spain, Sep. 14-17, 2003; [International Conference on Image Processing], IEEE Piscataway, NJ, USA, vol. 2, Sep. 14, 2003 (Sep. 14, 2003), pp. 679-682, XP010670617, ISBN: 978-0-7803-7750-9.

Extended European Search Report received for corresponding patent application No. EP 06014460.7-1522 dated Dec. 14, 2010.

Office Action received from Japan Patent Office mail date Apr. 24, 2012 for corresponding Japanese patent application No. 2006-191931.

Official Questioning mail date Oct. 11, 2011, received in corresponding Japanese Patent Application No. 2006-191931.

* cited by examiner

|   |   |   |
|---|---|---|
|   | b |   |
| a | m | c |
Fig. 1A
|   |   |   |
|---|---|---|
| a | m | c |
|   | b |   |
Fig. 1B
|   |   |   |
|---|---|---|
| m | b |   |
| a | c |   |
Fig. 1C
| Packet No. | Map Contents |
|---|---|
| 1 | No Map |
| 2 | Map (Pkt 1) |
| 3 | Map (Pkt 2) |
| 4 | Map (Pkt 3) |
| 5 | Map (Pkt 4) |
| 6 | Map (Pkt 5) |
| 7 (termination) | Map (Pkt 6) |
Fig. 2A
| Packet No. | Map Contents |
|---|---|
| 1 | No Map |
| 2 | Map (Pkt 1) |
| 3 | Map (Pkt 1,2) |
| 4 | Map (Pkt 1,2,3) |
| 5 | Map (Pkt 1,2,3,4) |
| 6 | Map (Pkt 2,3,4,5) |
| 7 (termination) | Map (Pkt 3,4,5,6) |
| 8 (termination) | Map (Pkt 4,5,6) |
| 9 (termination) | Map (Pkt 5,6) |
| 10 (termination) | Map (Pkt 6) |
Fig. 2B
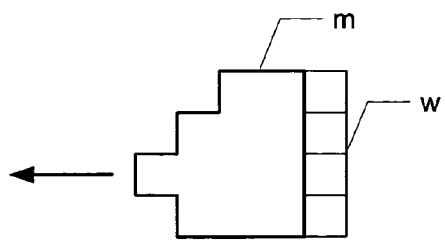
Fig. 3A
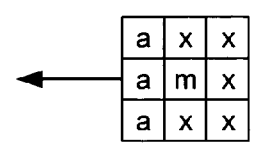
Fig. 3B

VIDEO ERROR CONCEALMENT METHOD

BACKGROUND OF THE INVENTION

1. Field of the Invention

The present invention relates generally to video communication and more particularly to a method of detecting and concealing errors in a video bitstream. The invention is described in the context of, and has particular applicability to, videoconferencing, although the concepts herein are generally applicable to any digitally encoded video stream.

2. Description of Related Art

Digitization of video images has become increasingly important. In addition to their use in global communication (e.g., videoconferencing), digitization of video images for digital video recording has also become increasingly common. In each of these applications, video information is transmitted across telecommunication links such as telephone lines, ISDN, DSL, and radio frequencies, or stored on various media devices such as DVDs and SVCDs. In many cases, the transmission and/or storage is susceptible to introducing errors into the video bitstream.

Efficient transmission, reception, and/or storage of video data typically requires encoding and compressing the video data. Several approaches and standards to encoding and compressing source video signals exist. Some standards are designed for a particular application, such as ITU-T Recommendations H.261, H.263, and H.264, which are used extensively in video conferencing applications. Additionally, standards promulgated by the Motion Picture Experts' Group (MPEG-1, MPEG-2, and MPEG-4) have found widespread application in consumer electronics and other applications. Each of these standards is incorporated by reference in its entirety.

In any case, a digital image is comprised of a rectangular array of individual pixels. Typically, the whole image is not processed at one time, but is divided into blocks that are individually processed. Each block comprises a rectangular grid of a predetermined number of luminance or luma pixels (which generally specify the brightness of a pixel) and a predetermined number of chrominance or chroma pixels (which generally specify the color of a pixel). A predetermined number of blocks are combined into a macroblock, which forms the basic unit of processing in most compression methods. Although some aspects of this hierarchy of processing units are discussed below, methods and techniques for block-based processing of images for processing are generally known to those skilled in the art, and thus are not repeated here in detail.

The macroblocks of image data may be encoded in a variation of one of two basic techniques. For example, "intra" coding may be used, in which the original macroblock is encoded without reference to historical data, such as a corresponding macroblock from a previous frame. Alternatively, "inter" coding may be used, in which the macroblock of image data is encoded in terms of the differences between the macroblock and a reference macroblock of data, such as a corresponding macroblock from a previous frame. Many variations on these two basic schemes are known to those skilled in the art, and thus are not discussed here in detail. It is generally desirable to select the encoding technique which requires the fewest number of bits to describe the macroblock of data. Intra coding typically requires many more bits to represent the block, and therefore inter coding is generally preferred.

Videoconferencing "calls" are typically placed using one of two technologies. Traditionally circuit switched networks (e.g., ISDN telephone lines) have been used. Typically these calls are placed according to International Telecommunications Union (ITU) Recommendation H.320, "Narrow-Band Visual Telephone Systems And Terminal Equipment." More recently, packet switched networks such as the Internet have become more widely used for videoconferencing. A variety of packet switched multimedia communication protocols exist, one example of which is ITU Recommendation H.323, "Packet-based Multimedia Communications Systems." Each of these recommendations is hereby incorporated by reference in its entirety. Although the description herein is in the context of one of these two protocols, it is noted that the invention is not limited to only these protocols.

Frequently a video bitstream is transported across both network technologies in tandem. For instance, H.320/H.323 gateways can be used to allow video calls to span two local area networks. Another common example is a multipoint call, where some connections to the MCU might use H.323, while others use H.320. A video transcoder is optionally deployed in the H.323/H.320 protocol conversion. However, video transcoders are expensive, and add delay to the call. So it is advantageous to convert the protocol without such transcoding.

Video calls transmitted using either technology are in many cases subject to errors in transmission. When packet switched networks are used for transmission, a transmission error results in one or more lost packets. Packet switched network protocols (such as RTP) allow the receiver to detect that one or more packets have been lost. When circuit switched networks such as ISDN are used for transmission of H.320, a transmission error results in one or more error bits in the bitstream. BCH codes are used to provide some error correction, however error bursts frequently have too many errors to be corrected.

Frequently the transmission error causes the decoder to lose synchronization. When this occurs, bits immediately following the error (though received correctly) must be discarded until synchronization is re-established. For instance, if a packet is lost with an H.263 video bitstream packetized using RFC 2429, subsequent received packets are discarded until a GOB (group of blocks) header or a PSC (picture start code) is found. Similarly, when an H.263 video is transmitted on an H.320 (circuit switched) connection, bits received after the transmission error and before the next GOB header or PSC are discarded.

Traditionally, when the decoder detects bit stream errors, it has two options. The first option is to freeze the display and request a fast update from the transmitter. The transmitter sends an intra frame upon such a request. The receiver's display remains frozen until the intra frame is received (or until a timeout period expires). These seconds of frozen video compromise the user experience. The second option is to request a fast update but continue displaying the frames that had errors. Until the requested intra frame arrives, there are artifacts like bright color blocks, black blocks, or scrambled images, etc. Such artifacts are typically more disruptive to the user experience than a frozen display, so common practice in the videoconferencing arts has been to hide the errors by choosing option one, i.e., freezing the display.

However, neither of the two options recited above is desirable. Therefore, what is needed in the art is an alternative technique of concealing errors in a video transmission that is less disruptive of the user experience. A preferred technique would be for the decoder to reconstruct the data that is missing or corrupted by the transmission losses (e.g., packet loss). To facilitate this, it is helpful if certain information either be redundantly transmitted or that the blocks be arranged so that missing data can be reconstructed by interpolation. The present invention is directed to such a system. Although described in terms of videoconferencing systems, the concepts described herein are equally adaptable to any video coding and decoding application.

SUMMARY OF THE INVENTION

Disclosed herein is a system and method for reconstruction video information lost as a result of transmission errors. The system and method have four aspects, including: (1) changing the bit and/or packet rate; (2) inserting redundant information into the video bitstream; (3) providing automatic refresh of certain regions of the video on a periodic basis; and (4) interleaving coded macroblocks into diversity groups for transmission to spatially spread the effect of lost packets. The image reconstruction may then take advantage of these three aspects to provide an enhanced result in the presence of transmission losses.

BRIEF DESCRIPTION OF THE DRAWINGS

FIG. 1A-C depict a technique estimating motion vectors of a lost macroblock by reference to surrounding macroblocks.

FIG. 2A-B depict the contents of packets containing non-overlapped inter maps (FIG. 2A) and overlapped inter maps (FIG. 2B).

FIG. 3A-3B depict a motion wake and a motion wake identification algorithm.

DETAILED DESCRIPTION OF THE INVENTION

As noted above, it is desirable to provide a way of reconstructing information lost from a video bitstream. In one aspect, the present invention relates to error correction techniques that include one or more of the following elements:

Changing the bit rate and/or the packet rate.
Inserting supplementary (redundant) information into the video bitstream.
Providing an automatic refresh mechanism and wake detection in the video encoder.
Interleaving the coded macroblocks into diversity groups prior to transmission.

These four elements may be combined in various ways to facilitate effective error concealment and recovery. Additionally, these elements are typically implemented in video encoder(s) and decoder(s) that may take various forms including various combinations of dedicated or shared general-purpose hardware, software, and firmware. Furthermore, various elements may be implemented, modified, or otherwise interact with video server devices such as gateways, multipoint control units (MCUs) and the like, which may be constructed from various combinations of general purpose and dedicated hardware, software, and firmware.

In a preferred embodiment, the receiver monitors the network quality and requests the sender to provide a specific combination of elements. The sender may take other factors into account (for instance, requests from other devices that are receiving the same stream, or (in the case of an intermediate gateway or MCU) the capabilities of the actual sender in its response. As is well known in the art, other methods can be used. For instance, a sender may be provided a priori or out-of-band information on the appropriate concealment mode. Or a sender may receive network quality statistics (for instance from RTCP), which it uses to select an appropriate mode.

Another aspect of the present invention relates to the minimization of the extent of the error. As described above, bits transmitted between the transmission error and the following synchronization header (e.g., the GOB header or PSC) must be discarded, even though they were received correctly. In a preferred embodiment, each transmitted packet begins with a synchronization header. This eliminates the need to discard correctly received packets due to resynchronization. Likewise, when converting from the H.320 protocol to the H.323 protocol, the gateway or MCU aligns each packet to start with a received synchronization header. Ideally each packet does not include other embedded synchronization headers (beyond the initial one at the packet start). Aligning the packets with the synchronization headers minimizes the extent of the error propagation, and can be implemented in protocol conversion devices without the need for video transcoding.

Changing the Bit Rate and/or the Packet Rate

A first approach to dealing with transmission errors, particularly those caused by lost packets or lost bits is to reduce the bit rate and/or the packet rate. In some cases, the lost packets may be due in part to sending packets faster than a given network element can receive them. In others, the packet overhead might be exacerbating network congestion. In either of these cases, reducing the packet rate might reduce the error rate. Note that the output packet rate partly depends on frame rate, particularly at lower bit rates.

Additionally, a variety of other error concealment techniques increase the bit rate and/or packet rate, so if errors are developing as a result of network congestion, employing the other error concealment techniques discussed herein may actually cause more errors than are concealed or corrected. Thus it is preferred to decrease the bit rate and/or packet rate by an amount that approximately offsets the increased bit rate and/or packet rate caused by the additional error concealment techniques.

Inserting Supplementary (Redundant) Information in the Video Bitstream

One element of the error correction technique described herein is the insertion of redundant information into the video bitstream. This redundant information ensures that a receiver (either an endpoint or a gateway or MCU) will be able to reconstruct an image even if some information is lost as a result of packet loss between the transmitter and receiver. The redundant information inserted in the bitstream includes a "map" of how each macroblock in the video frame was coded (i.e., whether inter or intra) and the motion vector field (i.e., the motion vectors for each inter coded block). This information may generally be encoded in the video bitstream in a variety of ways apparent to one skilled in the art. This redundant information, however encoded, is sufficient for the receiver to reconstruct missing data as a result of packet loss according to the following procedures.

In one embodiment, the redundant information can be inserted or removed by a gateway or an MCU without requiring full video encoding or decoding. The information is placed near the synchronization headers so that removal can be accomplished by decoding only some of the bitstream symbols. The information is byte-aligned, to simplify its removal. To insert the redundant information, most of the symbols in the bitstream do need to be decoded to extract the redundant information. However, the pixels in the images do not need to be decoded, which saves considerable computational resources and reduces delay.

By facilitating removal/insertion of the redundant information into the bitstream, the techniques disclosed herein allow an MCU (or gateway) to add redundant information selectively, e.g., for instance, to add this information only on network links where errors are occurring. In this mode of operation, the MCU uses the redundant information to reconstruct lost information in the bitstream. For instance, redundant motion vectors can be used to re-insert lost inter-coded blocks into the standards-compliant portion of the bitstream. As noted above, this repair can be accomplished without transcoding.

Also, endpoints that are only capable of receiving a standard bitstream (such as H.263), can be included in a conference that employs one or more of the various error concealment techniques described herein. Although the link between the MCU and such endpoints cannot carry this redundant information, all other endpoints benefit from the invention because the MCU is repairing bitstream errors received from the endpoints that do transmit the redundant supplementary information.

If the inter macroblock map indicates that a lost macroblock was not intra coded, (i.e., was inter coded), then the decoder (i.e., receiver, either an endpoint, gateway, or MCU) reconstructs the lost macroblock as a motion compensated inter block with no coded coefficients. Both the rendered picture and the decoder reference frame are updated using this reconstructed block. If an extended inter map (i.e., one that includes motion vectors) is received, then the redundant motion vector data from the map is used for the reconstructed block. Alternatively, if the inter map was lost, or if it does not include the redundant motion vector information, then an estimate of its motion vectors for the reconstructed block is computed by examining the motion vectors of neighboring blocks.

In one embodiment, the estimated motion vectors may be computed as the median of the motion vectors of 3 neighboring macroblocks (denoted a, b, and c). Specifically, the motion vector for lost macroblock m is computed to be (x,y) where x=median($a_x$, $b_x$, $c_x$) and $a_x$, $b_x$, $c_x$ are the x components of the motion vectors of macroblocks a, b, c. Similarly, y=median($a_y$, $b_y$, $c_y$) where $a_y$, $b_y$, $c_y$ are the y components of the motion vectors of macroblocks a, b, and c. Various arrangements of the reconstructed macroblock and the neighboring macroblocks used to compute motion vectors for the reconstructed macroblocks are illustrated in FIG. 1A-1C. For example, for most macroblocks, the arrangement of FIG. 1A will be suitable. If a block is on the top picture edge, a reflection of FIG. 1A is used, as illustrated in FIG. 1B. If a reconstructed block is in the corner of the image, the only three adjacent blocks are used, as illustrated in FIG. 1C. Additionally, the following boundary conditions apply for reconstructing motion vectors at the picture edges:

(a) at the left edge of the picture if(x<0),then x=0;
(b) at the right edge of the picture if(x>0),then x=0;
(c) at the top edge of the picture if(y>0),then y=0;
(d) at the bottom edge of the picture if(y<0),then y=0;

If the lost macroblock is an intra coded macroblock, it is reconstructed only if interleaving (discussed below) is turned on. However, it should be noted that if a lost intra macroblock is at the edge of the picture, it is not reconstructed, whether interleaving is on or not. If interleaving is not turned on, the missing macroblock is treated as though it were not coded according to whatever video encoding algorithm is in use. If a block is reconstructed, both the rendered picture and the decoder reference frame are updated using this reconstructed block.

If an intra macroblock is to be reconstructed, an estimate of the lost intra macroblock's contents is generated from a spatial interpolation of the adjacent macroblocks. The preferred interpolation method is bi-linear interpolation, although a variety of interpolations could be used.

Specifically, for the 8×8 luminance block in the upper left-hand corner of the macroblock, 8 pixels from the last row of pixels of the macroblock immediately above and 8 pixels from the right-most column of the macroblock to the left are 2 dimensionally bi-linearly interpolated to create the pixel values associated with the lost macroblock. Similarly, for the 8×8 block in the upper right-hand corner, 8 pixels from the last row of pixels of the macroblock immediately above and 8 pixels from the left-most column of the macroblock to the right are 2 dimensionally bi-linearly interpolated. The remaining blocks are processed in a similar fashion. For each chroma block, 8 pixels from the last row of the macroblock immediately above and 8 pixels from the right-most column of the macroblock to the left are 2 dimensionally bi-linearly interpolated.

Even at modest packet loss rates, it is possible that both the primary video and redundant map/motion vector information for the same packet will be lost. For example, if the packet loss rate is $\frac{1}{6}$, the odds of losing both sources of picture information are $\frac{1}{36}$. In a 30 frame per second video call, this will occur approximately once per second. Overlapping the redundant data can substantially reduce these odds.

When overlap is not in use, the first packet in each frame holds no inter map or motion vector information. Each subsequent packet in the frame holds the inter map and motion vector information for the previous packet. Following the final video packet, a map termination packet is sent, which holds the map information from the final video packet. For example, consider a CIF frame with a diversity number of 6. Each frame will have at least 7 packets, with the map elements as shown in FIG. 2A.

When overlapping is in use, the redundant information is sent more than once. Specifically, each map entry is sent multiple times. For an overlap of n, each packet holds the map information for the previous n+1 packets. If fewer than n+1 packets have been sent, the entire map (starting from macroblock 0) is sent. After the final video packet is sent, multiple map termination entries are transmitted to achieve the desired redundancy for all packets in the frame. If the overlap is set to 3, each frame will require 10 packets to transmit, with the map elements as shown in. FIG. 2B.

As an example, if the overlap is set to 2, the motion vectors are sent three times for each macroblock (in addition to the macroblock itself). These transmissions are in distinct packets. Thus the motion vectors for a macroblock will be sent in each of the next three packets following the packet containing the macroblock. In the above example, with a packet loss rate of $\frac{1}{6}$ and a frame rate of 30 frames per second, the odds of losing both the map and the macroblock are reduced to $\frac{1}{1296}$, or approximately every 40 seconds. However, because sending the motion vectors multiple times adds considerably to the bit rate overhead, overlap is most advantageous at higher bit rates. If the interleave (described below) is being used, the overlap cannot exceed the number of diversity groups. If interleave is not being used, the overlap cannot exceed the number of GOBs in the image.

Automatic Refresh Mechanism and Wake Detection

A second key element of the error concealment techniques described herein is a refresh mechanism and/or wake detection algorithm. A refresh mechanism should be used to clean up residual encoder/decoder reference frame mismatches that result from packet loss. The refresh mechanism intra-codes macroblocks in the image in a deterministic pattern. This limits the propagation of errors, especially in moving areas. Any refresh pattern can be used, as long as it systematically refreshes each macroblock in the image at the specified rate. One suitable refresh mechanism is a walk around refresh, which operates as follows. A walk-around interval w specifies the spacing between intra-coded blocks. Thus, every $w^{th}$ macroblock is coded as intra (starting from a starting block s). The starting block s is reset for the next picture as (l+w) mod b, where l is the last block refreshed in this picture, and b is the number of blocks in the picture. ("Mod" is, of course, the modulo or modulus function.)

Care must be taken in choosing w, so that no block in the picture is skipped. It is also suggested that w should not be a multiple of the diversity number (discussed below), so as to spread the intra-coded blocks in a frame evenly across the diversity groups. A simple method of ensuring that w meets these constraints is to make w a prime number that is not a factor of the diversity number.

A wake detection algorithm may also be included. When coding video, there often exists a region in a video frame where a moving object m has revealed or uncovered a part of the background. This background region w is called the motion wake or more simply the wake, and is depicted in FIG. 3A. When performing error concealment, motion prediction errors that occur in the motion wake tend to be persistent, causing distracting visual artifacts. Encoding the macroblocks in the motion wake as intra reduces these artifacts. It is also desirable to reduce the coding threshold and quantization parameter in the wake, to keep the background sharp around the moving areas of the picture.

One technique for detecting the motion wake is as follows: For a given macroblock showing no motion, the motion vectors of adjacent macroblocks are checked. Four tests are performed, each checking for one of left, right, up, or down motion. If any of these tests are true, the macroblock is identified as being in the motion wake, and should be intra coded. FIG. 3B illustrates the test for left (the tests for other directions are similar, and thus are not described in detail). If the three left neighbors of macroblock m (labeled "a" in FIG. 3B) show motion to the left and the macroblock "m" has little or no associated motion then macroblock m is said to be in the motion wake. More specifically, the condition specifying little of no motion may be written, $|MVx|<2$ and $|MVy|<2$ where MVx and MVy are the x and y motion vector components of macroblock "m."

Interleave/Diversity Groups

A third element of the error correction techniques described herein is the use of interleaved macroblocks, aka diversity groups. Normally, in H.263 the macroblocks are sent in raster-scan order. For instance, in a CIF picture, there are 396 macroblocks with a transmission index that ranges from 0 (upper left) to 395 (lower right). The macroblocks are organized into Groups of Blocks (GOBs), which are spatially adjacent in the picture. However, an additional technique that can be used for error recovery is macroblock interleaving. If macroblock interleaving is in use, the macroblock transmission number is altered as follows: First each macroblock is assigned to a diversity group, by taking the transmission index mod diversity number. (The diversity number is the number of diversity groups.) A diversity group is essentially a GOB that comprises non-spatially adjacent blocks. This spatially spreads the error from lost packets, allowing use of various interpolative methods for error concealment. Note that when the H.264 baseline profile is used for encoding, FMO (flexible macroblock ordering) can be used to created diversity groups.

Because diversity groups are a special kind of GOB, the bitstream can include GOB headers, using the diversity group index as the GOB number. After being assigned to a diversity group, the macroblocks are (re-)ordered by diversity group (with group 0 first). Within a diversity group, macroblocks are sent such that their addresses increase monotonically. When the far end has requested macroblock interleaving, it specifies the diversity number. The diversity number: (a) need not be a divisor of the number of macroblocks in the image; (b) shall not be a divisor of the macroblocks per row (otherwise the reconstruction techniques described above will not operate correctly); (c) shall be in the range 2-30; and (d) shall not exceed the number of GOBs in the image.

For example, consider a QCIF resolution image (9 rows of 11 macroblocks) with a diversity number of 3. Normally, the 99 macroblocks would be sent sequentially (0-98). The macroblocks are organized into 9 GOBs (numbered 0-8) of 11 macroblocks each. However, with interleaving on, the macroblocks are grouped into three diversity groups (DG0, DG1, and DG2), and the macroblocks are sent in the following order:

| | |
|---|---|
| DG0: | 0, 3, 6, 9, 12, 15, 18, 21, 24, 27, 30, 33, 36, 39, 42, 45, 48, 51, 54, 57, 60, 63, 66, 69, 72, 75, 78, 81, 84, 87, 90, 93, 96 |
| DG1: | 1, 4, 7, 10, 13, 16, 19, 22, 25, 28, 31, 33, 37, 40, 43, 46, 49, 52, 55, 58, 61, 64, 67, 70, 73, 76, 79, 82, 85, 88, 91, 94, 97 |
| DG2: | 2, 5, 8, 11, 14, 17, 20, 23, 26, 29, 32, 35, 38, 41, 44, 47, 50, 53, 56, 59, 62, 65, 68, 71, 74, 77, 80, 83, 86, 89, 92, 95, 98 |

It should be noted that each of the three diversity groups must be sent as separate packets.

Each of the elements of an error correction algorithm described herein may be implemented individually or together to accomplish a desired level of error correction within a given computational capacity or other capability framework. Additionally, the techniques may be implemented in various combinations of hardware, software, and firmware and may be implemented in video encoders, decoders, gateways, MCUs, etc., as appropriate. For example, although certain elements of the system described herein require a particular action by an encoder, a decoder capable of receiving such a stream may request that the encoder transmit the bitstream using one or more of these features in response to the loss of one or more video packets. Various details necessary for implementation of such systems, for example, particular bitstream modifications required to carry the supplemental information or construction of computation algorithms to determine items described herein, would be apparent to one skilled in the art having the benefit of this disclosure, and thus are not reproduced here.

Although the techniques described herein are primarily designed to deal with packet loss, they are also compatible with telephony network protocols such as H.320. This provides error concealment and recovery for multipoint conferences and gateway calls that include endpoints on both packet networks and telephony networks.

The invention has been explained with reference to exemplary embodiments. It will be evident to those skilled in the art that various modifications may be made thereto without departing from the broader spirit and scope of the invention. Further, although the invention has been described in the context of its implementation in particular environments and for particular applications, those skilled in the art will recognize that the present invention's usefulness is not limited thereto and that the invention can be beneficially utilized in any number of environments and implementations. The foregoing description and drawings are, accordingly, to be regarded in an illustrative rather than a restrictive sense.

What is claimed is:

1. A method of digitally encoding a video bitstream to facilitate the concealment of errors caused by loss of some portion of the video bitstream, the method comprising:
   inserting redundant information in the video bitstream on an ongoing basis, wherein the redundant information comprises a map specifying whether each block was coded using intra or inter coding and redundant motion vectors for each inter coded block; and
   overlapping the redundant information over a plurality of packets such that at least one packet contains redundant information corresponding to two or more previous packets,
   wherein the redundant information is inserted into the bitstream at the request of a receiver.

2. The method of claim 1 wherein the redundant information is inserted into the bitstream by an MCU.

3. The method of claim 1 further comprising periodically coding each block of the video bitstream as an intra coded block using a deterministic pattern.

4. The method of claim 3 wherein the deterministic pattern is a walk-around refresh.

5. The method of claim 1 further comprising coding each block of the video bitstream determined to be in a motion wake as an intra coded block.

6. The method of claim 1 further comprising interleaving coded macroblocks into a plurality of diversity groups for transmission, wherein spatially adjacent macroblocks are assigned to different diversity groups.

7. The method of claim 1 further comprising assigning each of a plurality of macroblocks to one of a plurality of diversity groups such that each diversity group contains non-spatially adjacent macroblocks, wherein the diversity groups are transmitted in separate packets.

8. A method of decoding a video bitstream, the method comprising:
   receiving a video bitstream wherein at least some portions of the video bitstream are lost;
   identifying at least one lost macroblock; and
   referring to a redundant inter macroblock map embedded in the video stream by an MCU at the request of a receiver, in order to determine how to reconstruct the lost macroblock,
   wherein if the inter macroblock map indicates that the lost macroblock was inter coded, the lost macroblock is reconstructed using redundant motion vectors embedded in the video bitstream by an MCU at the request of a receiver.

9. The method of claim 8 wherein if the inter macroblock map indicates that the lost macroblock was intra coded, the lost macroblock is reconstructed as an uncoded macroblock.

10. The method of claim 8 wherein if the inter macroblock map indicates that the lost macroblock was intra coded, the lost macroblock is reconstructed by spatial interpolation of adjacent macroblocks.

11. A method of decoding a video bitstream, the method comprising:
   receiving a video bitstream wherein at least some portions of the video bitstream are lost;
   identifying at least one lost macroblock; and
   referring to a redundant inter macroblock map embedded in the video stream by an MCU at the request of a receiver, to determine how to reconstruct the lost macroblock,
   wherein if the inter macroblock map indicates that the lost macroblock was intra coded and the macroblock is at an edge of a picture, the macroblock is not reconstructed.

12. The method of claim 11 wherein if the inter macroblock map indicates that the lost macroblock was inter coded, the lost macroblock is reconstructed by estimating motion vectors from one or more surrounding macroblocks.

13. The method of claim 12 wherein estimating motion vectors from one or more surrounding macroblocks comprises computing the median of motion vectors of a plurality of neighboring macroblocks.

14. A method of conducting a multipoint video conference wherein a multipoint control unit facilitates the concealment of errors on at least one link caused by loss of some portion of a video bitstream along that link, the method comprising:
   inserting redundant information into the video bitstream on an ongoing basis, wherein the redundant information comprises a map specifying whether each block was coded using intra or inter coding and redundant motion vectors for each inter coded block; and
   overlapping the redundant information over a plurality of packets such that at least one packet contains redundant information corresponding to two or more previous packets.

* * * * *